3,073,695
METHOD FOR PRODUCING IRON POWDER HAVING LOW CARBON AND OXYGEN CONTENTS

Hermann Silbereisen, Moenchengladbach, and Max Michalke, Rheydt, Germany, assignors to Mannesmann Aktiengesellschaft, Dusseldorf, Germany, a German company
No Drawing. Filed Nov. 8, 1960, Ser. No. 67,911
2 Claims. (Cl. 75—.5)

This invention relates to a method for producing iron powder having low carbon and oxygen content.

In producing iron powder according to the so-called RZ process (Pig Iron-"Zunder"-Process, described, for example, in "Stahl and Eisen" (1948), pp. 346–353), a molten iron-carbon alloy is first atomized with compressed air to form a crude powder having high carbon and oxygen contents, on the order of 3.0 to 4.0% for carbon and 5 to 7% for oxygen. Next this powder is reduced by roasting or calcination at say 1100° C. and thereby changed into a soft iron powder, which may be used, for example, to produce sintered objects, in welding electrodes and for powder-gas cutting. In this conventional reducing step, which is carried out without using a protective gas, the carbon and oxygen contained in the crude powder react to form a $CO/CO_2$ mixture.

Because the crude powders obtained during atomization show variable carbon and oxygen contents, iron-oxides or carbon carriers such as high grade ore, mill scale or charcoal are added to the crude powder, generally before the reduction treatment, to adjust the carbon-oxygen ratio to that stoichiometrically necessary to give a balanced decrease in both carbon and oxygen. In some cases, several powders having different C/O ratios may be mixed, in place of adding carbon or oxygen carriers, with the same effect.

In all such prior processes, however, the final product still contains more or less high residual contents of carbon and oxygen, on the order of 0.05 to 0.10% carbon and 0.50 to 1.0% oxygen. Thus, during the reduction process, which is carried out either batchwise, as in a muffle furnace or in a furnace through which the powder moves continuously, the reaction between the carbon and oxygen progresses quickly and vigorously at first, but then fades out more and more. The result is that the residual carbon and oxygen contents can be reduced only by an excessive prolongation of the roasting treatment. Even then the desired reduction of carbon and oxygen cannot be obtained in all cases. Moreover, the particles of iron powder become welded together so strongly that the roasted mass can be again reduced to powder only with great difficulty by vigorous cold working.

In accordance with the invention, these disadvantages are eliminated. Surprisingly it has been found that the carbon-oxygen reaction can be made to go faster and to far lower contents of carbon and oxygen, without any increase in temperature, or even at lower than normal temperatures, if a CO- and $CO_2$-free gas is conducted over the mass being reduced by roasting or calcination.

The invention thus comprises a method for producing iron powder having low carbon and oxygen contents which comprises reducing raw powder having high carbon and oxygen contents by roasting said raw powder and passing a gas free from CO and $CO_2$ over the power during roasting.

In carrying out the process according to the invention, the reduction may be carried out at conventional temperatures or even lower, say in the overall range of 1000 to 1150° C. At the beginning of the reduction, the powder will normally have an oxygen content of say 6.2 to 6.5% by weight and a carbon content of say 3.5 to 3.7% by weight.

The carbon-oxygen ratio will depend on the nature of the gas used, as will be brought out below. It will also depend on the temperature at which the process is carried out. Broadly, it will range from 1.7:1 where a nitrogen containing gas is used to 2.3:1 where a hydrogen containing gas is used.

The particle size of the powder will normally be in the range between about 0.02 and about 0.6 mm.

The reduction may be carried out batchwise, e.g. in a muffle furnace, or as a continuous process. The most significant effects of the invention occur toward the end of the reducing period, and accordingly where a muffle furnace is used, the CO—$CO_2$-free atmosphere may be maintained only in the terminal phase of the process. Generally speaking total residence time will be on the order of 6 to 8 hours, of which at least the last 1 to 2 hours should be in a CO- and $CO_2$-free atmosphere. In a continuous process, best results are obtained when the gas is passed counter-current to the movement of the powder. Again, total residence time will generally be 3 to 6 hours and the rates of movement of gas and powder should be adjusted so that the last 1 to 2 hours are in an atmosphere containing not more than 50% by volume $CO+CO_2$.

The CO and $CO_2$-free gas used may be a gas such as nitrogen which at the reduction temperature remains entirely inert to the iron powder. In some cases atmospheric air may be used for economic reasons. Here, however, the C/O ratio of the powder must be increased by increasing the carbon content, to compensate for the oxygen in the air. This will normally be done by adding a carbon carrier such as charcoal to the raw powder. The proportion added should be such as to increase the C/O ratio to somewhere in the range 0.2 to 0.4, depending on reduction temperature. Higher temperatures favoring CO formation will require higher ratios.

The pressure of the gas as it passes over the powder may range from say 1.00 kg./cm.² to 1.02 kg./cm.², absolute.

To produce iron powder which is particularly well adapted for use in making parts by pressing and sintering, hydrogen or a hydrogen-rich gas may be used. It has been found experimentally, for instance, that a soft-iron powder containing 0.04% carbon and 0.20% oxygen is best suited for pressing and sintering if it has been reduced in the presence of hydrogen. The reason for this is probably that the surface of the powder particles has been affected in some way by the hydrogen and made more "sinter-active" than would be the case if the reduction had been conducted in the presence of some other gas.

For economic reasons the hydrogen may be used in the form of a gas obtained by converting the CO—$CO_2$ containing gas resulting from the present process through the use of steam, according to the reaction $$CO+H_2O \rightarrow CO_2+H_2$$

The technique used for this purpose is conventional and is described, for example, in B. Neumann "Chemische Technologie" (1939), p. 403. Of course, the gas must be purified of $CO_2$, as by an alkaline wash, before being returned to the iron powder reduction step.

The use of hydrogen in the present process has the further advantage that in the case of a raw powder having an oxygen surplus it is unnecessary to add carbon to the powder to achieve a stoichiometric carbon-oxygen balance since the excess oxygen is reduced at the end of the roasting by the hydrogen-rich gas.

Moreover, the basic atomization process used to make the raw powder can easily be carried out in such a way as to give a raw powder having surplus oxygen (with respect to carbon), even though the extent of the oxygen surplus may vary. Thus, a further advantage arises in using hydrogen in the present process in that the atomized raw powder may be fed immediately into the reduction process without interrupting the flow of material for analysis and balancing of the carbon-oxygen ratio, as by mixing several types of powder.

The invention will be further described by reference to the following specific examples which are furnished for illustration purposes only and are not to be taken as in any way limiting the invention beyond the scope of the appended claims.

*Example I*

Raw iron powder containing 3.6% carbon and 6.4% by weight oxygen is introduced into a muffle furnace, provided with a small opening at either end, at 1050° C. A stream of nitrogen is passed through the furnace, using the small openings, at substantially atmospheric pressure. After 7 hours the powder is removed.

It is found to contain 0.04% carbon and 0.30% $O_2$. In a parallel experiment where no nitrogen was furnished, after 7 hours the powder contained 0.08% carbon and 0.50% oxygen.

*Example II*

Raw iron powder containing 3.7% by weight carbon and 6.5% by weight oxygen is passed slowly and continuously through a furnace maintained at 1050° C. A stream of nitrogen, at substantially atmospheric pressure is passed counter-current to the moving mass of powder. The total residence time of the powder in the furnace is 4 hours. The resulting powder contains 0.05% carbon and 0.25% oxygen.

*Example III*

The procedure of Example II is repeated, substituting hydrogen for nitrogen. The resulting powder contains 0.15% oxygen and 0.07% carbon.

*Example IV*

Raw iron powder containing 3.6% C and 5.5% $O_2$ is mixed with 0.2% on the weight of the raw powder, of charcoal to increase the carbon/oxygen ratio. This powder is then placed in the muffle furnace of Example I at 1050° C. for 7 hours. Air is introduced at atmospheric pressure for the terminal 60 minutes of this period. The resulting powder contains 0.05% C and 0.30% $O_2$.

*Example V*

Raw iron powder containing 3.3% C and 7.0% $O_2$ is run as a continuously moving bed through a furnace maintained at 1050° C. Over the bed is passed initially a stream of hydrogen at atmospheric pressure.

The gas issuing from the bed is passed continuously over a iron oxide catalyst at 550° C. and is then washed with dilute aqueous NaOH and recycled to the furnace, whilst the hydrogen stream initially supplied is reduced. When equilibrium is reached the gas supplied to the bed has the following composition (percent by volume):

| | |
|---|---|
| $H_2$ | 75 |
| CO | 20 |
| $CO_2$ | 5 |
| | 100 |

The gas leaving the bed has the following composition (percent by volume):

| | |
|---|---|
| $CO_2$ | 10 |
| CO | 30 |
| $H_2O$ | 15 |
| $H_2$ | 45 |
| | 100 |

The residence time of the powder in the furnace is 4 hours. The powder produced under equilibrium conditions contains 0.03% C and 0.20% $O_2$.

What is claimed is:

1. A method for making iron powder low in carbon and oxygen which comprises reducing raw powder rich in carbon and oxygen by roasting said powder, passing a hydrogen-containing gas free from CO and $CO_2$ over said powder during said reduction to remove carbon and oxygen from said powder with the production of a gas containing CO and $CO_2$, treating said gas containing CO and $CO_2$ with steam to give a gas containing hydrogen, and using the last named gas as the source of the hydrogen-containing gas first referred to.

2. The method claimed in claim 1 wherein the iron powder has a stoichiometric excess of oxygen, compared to carbon.

References Cited in the file of this patent

UNITED STATES PATENTS

| 2,170,158 | Rennerfelt | Aug. 22, 1939 |
| 2,282,124 | Fahrenwald | May 5, 1942 |
| 2,282,144 | Fahrenwald | May 5, 1942 |

OTHER REFERENCES

Naeser et al.: Stohl und Eison, vol. 68, No. 19/20, Sept. 9, 1948, pp. 346–353, published by verlog Stahleisen M.B.H., Dusseldorf, Germany.